(12) United States Patent
North et al.

(10) Patent No.: US 12,065,055 B2
(45) Date of Patent: *Aug. 20, 2024

(54) CONDITIONING AN ELECTRIC GRID USING ELECTRIC VEHICLES

(71) Applicant: RECARGO, INC., El Segundo, CA (US)

(72) Inventors: Forrest North, El Segundo, CA (US); Armen Petrosian, El Segundo, CA (US); Lucas Manfield, El Segundo, CA (US)

(73) Assignee: RECARGO, INC., El Segundo, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/080,483

(22) Filed: Oct. 26, 2020

(65) Prior Publication Data

US 2021/0096582 A1    Apr. 1, 2021

Related U.S. Application Data

(63) Continuation of application No. 15/255,798, filed on Sep. 2, 2016, now Pat. No. 10,816,997, which is a
(Continued)

(51) Int. Cl.
*B60L 53/64* (2019.01)
*B60L 53/36* (2019.01)
(Continued)

(52) U.S. Cl.
CPC .............. *B60L 53/64* (2019.02); *B60L 53/36* (2019.02); *B60L 53/665* (2019.02); *B60L 55/00* (2019.02); *G05D 1/0027* (2013.01);

*G05D 1/0291* (2013.01); *G07C 5/008* (2013.01); *H02J 7/0013* (2013.01); *H02J 7/00034* (2020.01);
(Continued)

(58) Field of Classification Search
CPC ........ B60L 53/64; B60L 53/36; B60L 53/665; B60L 55/00; G05D 1/0027; G05D 1/0291; G07C 5/008; H02J 7/0013; H02J 7/00034; Y02E 60/00; Y02T 10/70; Y02T 10/7072; Y02T 90/12; Y02T 90/14; Y02T 90/16; Y02T 90/167; Y02T 90/169; Y04S 10/126; Y04S 30/14
See application file for complete search history.

(56) References Cited

U.S. PATENT DOCUMENTS

| 8,198,959 B2 | 6/2012 | Takahara |
| 9,434,271 B2 | 9/2016 | North et al. |

(Continued)

FOREIGN PATENT DOCUMENTS

CA        2672454 A1 *  6/2008  .......... B60L 11/1816

*Primary Examiner* — Nghia M Doan
(74) *Attorney, Agent, or Firm* — AMPACC Law Group, PLLC

(57) ABSTRACT

A grid to vehicle system is described. In some examples, the system selectively controls one or more electric vehicles connected to an electric grid based on conditions associated with the electric grid. For example, the system may control charging operations of the electric vehicles based on load balancing conditions associated with the electric grid, based on cost conditions associated with electric power provided by the electric grid, and so on.

17 Claims, 4 Drawing Sheets

Related U.S. Application Data continuation of application No. 14/018,048, filed on Sep. 4, 2013, now Pat. No. 9,434,271.

(60) Provisional application No. 61/696,480, filed on Sep. 4, 2012.

(51) Int. Cl.
*B60L 53/66* (2019.01)
*B60L 55/00* (2019.01)
*G05D 1/00* (2006.01)
*G07C 5/00* (2006.01)
*H02J 7/00* (2006.01)

(52) U.S. Cl.
CPC ............... *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(56) References Cited

U.S. PATENT DOCUMENTS

| | | |
|---|---|---|
| 2009/0174365 A1 | 7/2009 | Lowenthal et al. |
| 2010/0017045 A1* | 1/2010 | Nesler ............ G06Q 50/06 700/295 |
| 2010/0141204 A1 | 6/2010 | Tyler et al. |
| 2010/0141205 A1 | 6/2010 | Tyler et al. |
| 2011/0001356 A1 | 1/2011 | Pollack |
| 2011/0106321 A1* | 5/2011 | Cherian ............ H02J 13/00034 700/286 |
| 2014/0100708 A1* | 4/2014 | Ukita ............ H02J 7/00036 700/297 |
| 2016/0332527 A1 | 11/2016 | North et al. |

\* cited by examiner

CONDITIONING AN ELECTRIC GRID USING ELECTRIC VEHICLES

CROSS-REFERENCES TO RELATED APPLICATIONS

This application is a continuation of U.S. Non-Provisional application Ser. No. 15/255,798, filed on Sep. 2, 2016, now U.S. Pat. No. 10,816,997, issued Oct. 27, 2020, which is a continuation of U.S. Non-Provisional application Ser. No. 14/018,048, filed on Sep. 4, 2013, now U.S. Pat. No. 9,434,271, issued Sep. 6, 2016, which claims priority to U.S. Provisional Patent Application No. 61/696,480, filed on Sep. 4, 2012, entitled CONDITIONING AN ELECTRIC GRID USING ELECTRIC VEHICLES, which are hereby incorporated by reference in their entirety.

BACKGROUND OF THE INVENTION

An electric grid is a network of components that enable consumers to receive power from suppliers. The electric grid may include components that generate power (e.g., electricity generation plants), components that transfer power (e.g., transmission lines), components that absorb power (e.g., resistors), components that store power to consumers, such as households, buildings, and so on.

In order to avoid sub-optimal conditions associated with the generation, transmission, and/or distribution of electric power, an electric grid may utilize and/or facilitate the use of demand response systems, load balancing systems, storage systems, and other smart grid systems. For example, an electric grid may maintain components that ensure the grid is balanced, such as during peak conditions or in excess production times during off-peak conditions.

DETAILED DESCRIPTION OF THE INVENTION

Overview

A grid to vehicle (g2v) system is described. In some examples, the system selectively controls one or more electric vehicles connected to an electric grid based on conditions associated with the electric grid. For example, the system may control charging operations of the electric vehicles based on load balancing conditions associated with the electric grid, based on cost conditions associated with electric power provided by the electric grid, and so on.

When the g2v system receives information from an electric grid that the grid is unbalanced, the g2v system may selectively control charging operations of one or more electric vehicles connected to the grid in order to balance, or assist in balancing, the grid.

The system will now be described with respect to the various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
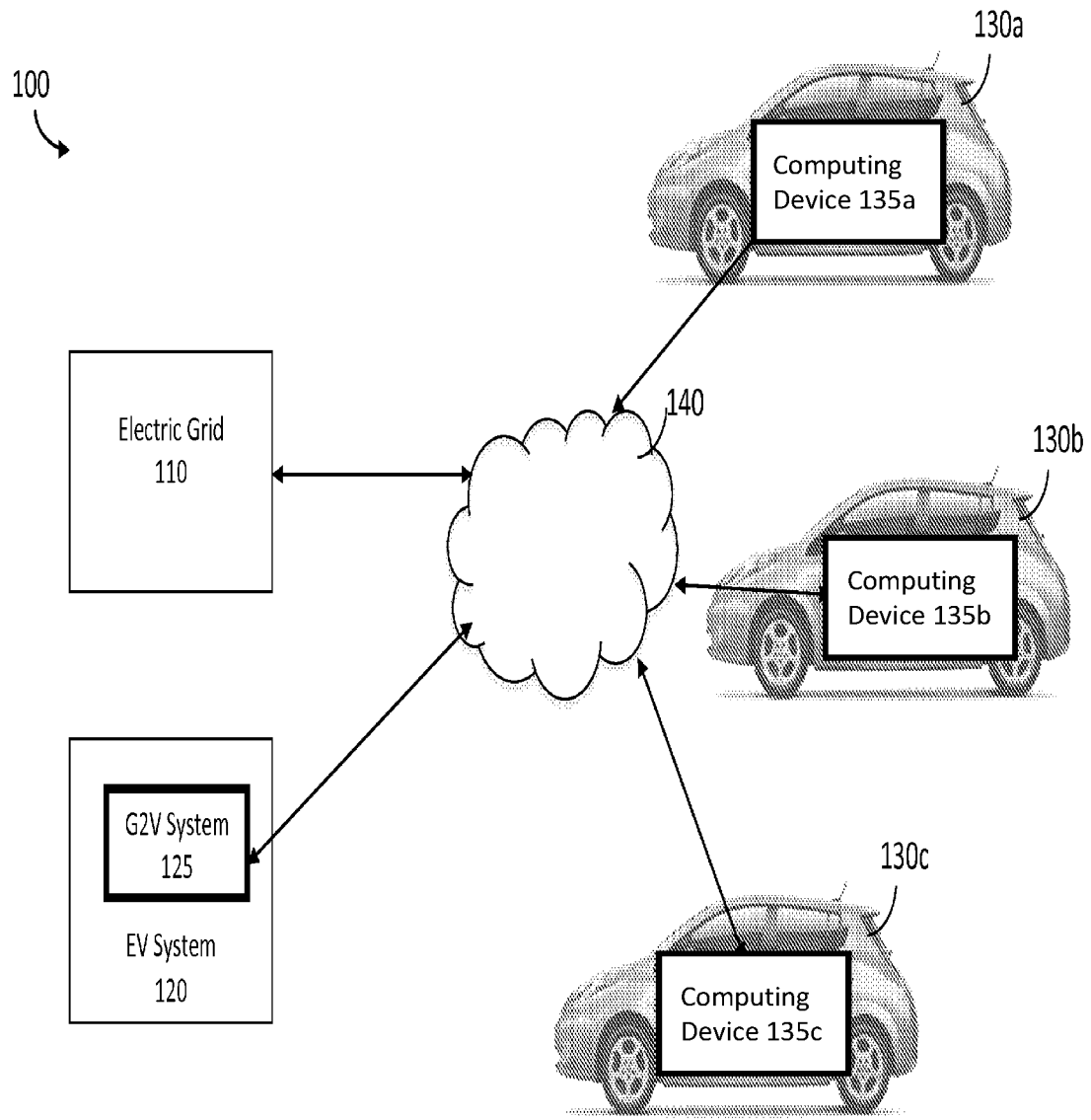
FIG. 1 is a block diagram illustrating components of a suitable computing environment.

As described herein, a grid to vehicle (g2v) system is described. FIG. 1 illustrates components of a suitable computing environment 100 in which the g2v system may be supported and/or implemented. The computing environment 100 includes a utility grid 110, an electric vehicle device 120 that provides a grid to vehicle system 125, one or more electric vehicles (EVs) 130a-c (e.g., a vehicle, plugin hybrid, range extended hybrid, electric traction or battery or plugin vehicle), a network 140 that facilitates communications between the utility grid 110, the EV device 120, and one or more computing devices 135a-c (e.g., car area networks) within the electric vehicle 130. In some cases (not shown), the network 140 may facilitate communications between the grid 110, the EV system 120, and charging stations that provide electric power to the electric vehicles 130a-c.

The EV computing device 120 may be a tablet computer, mobile device, smart-phone, net-book, mobile GPS navigation device, remote control, fixed telephone or communications console or apparatus, surface or tabletop computer, overhead image projector, desktop computer, server computer, or any computing system. The EV computing device 120 includes various hardware and/or software components in order to provide such functionality. For example, the EV computing device 120 includes various human interface components, device components, and memory, and so on. The network 140 may be a Local Area Network (LAN), a Wide Area Network (WAN), the Internet or other networks capable of facilitating various communications between computing devices.

FIG. 1 and the discussion herein provide a brief, general description of a suitable computing environment in which the g2v system can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet applicants, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," "and host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Figure 2:
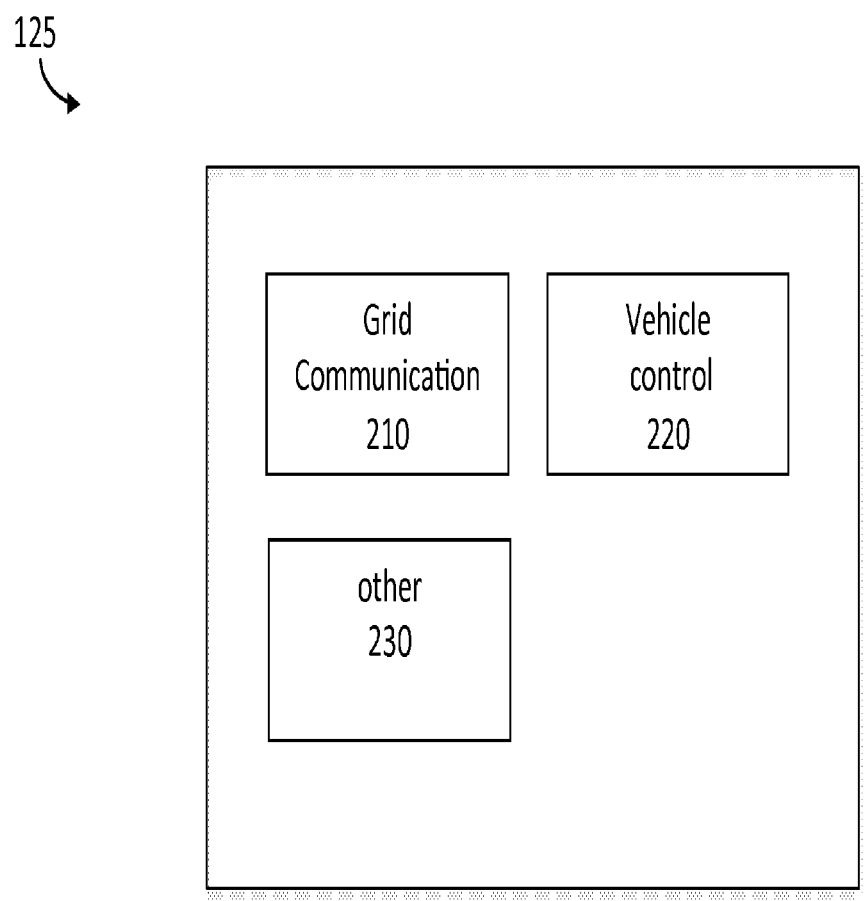
FIG. 2 is a block diagram illustrating components of a grid to vehicle (g2v) system.

Examples of Controlling Operation of an Electric Vehicle Based on Electric Grid Conditions As described herein, in some examples, the grid to vehicle system 125 controls, among other things, charging operations at or associated with one or more electric vehicles connected to an electric grid. FIG. 2 is a block diagram illustrating components of a grid to vehicle (g2v) system 125.

The grid to vehicle system 125 includes a variety of functional modules, such as a grid communication module 210 a vehicle control module 220, and other modules 230. One skilled in the art will appreciate that the functional modules are implemented with a combination of software (e.g., executable instructions, or computer code) and hardware (e.g., at least a memory and processor). Accordingly, as used herein, in some examples a module is a processor-implemented module and represents a computing device having a processor that is at least temporarily configured and/or programmed by executable instructions stored in memory to perform one or more of the particular functions that are described herein.

In some examples, the grid communication module 210 is configured and/or programmed to receive or access information from a utility grid 110, such as information identifying a current or scheduled load condition associated with the grid. The grid communication module 210 may also provide information to the utility grid, such as information identifying an amount of power storage capacity associated with electric vehicles under control by the g2v system 125.

In some examples, the grid communication module 210 may receive or access information from various types of electric grid or electric power systems, such as a micro-grid, a household or commercial grid or system (e.g., an on-grid or off-grid system), and so on.

In some examples, the vehicle control module 220 is configured and/or programmed to control operation of one or more electric vehicles connected to an electric grid. The vehicle control module 220 may be configured to control charging operations associated with the electric vehicles. For example, the vehicle control module 220 may:

Begin, commence, or modify a charging operation associated with one or more electric vehicles in response to information received from an electric grid; and/or Stop, pause, or prevent a charging operation associated with one or more electric vehicles in response to information received from an electric grid; and so on.

Thus, in some examples, the g2v system 125 receives information associated with electric grid conditions, and controls the operation of electric vehicles that are connected to the electric grid, such as by transmitting control instructions to the electric vehicle or vehicles based on the received information. For example, the g2v system 125 may control multiple vehicles associated with an electric grid, a fleet of vehicles associated with a micro-grid, a single vehicle associated with a household power system, and so on.

Figure 3:
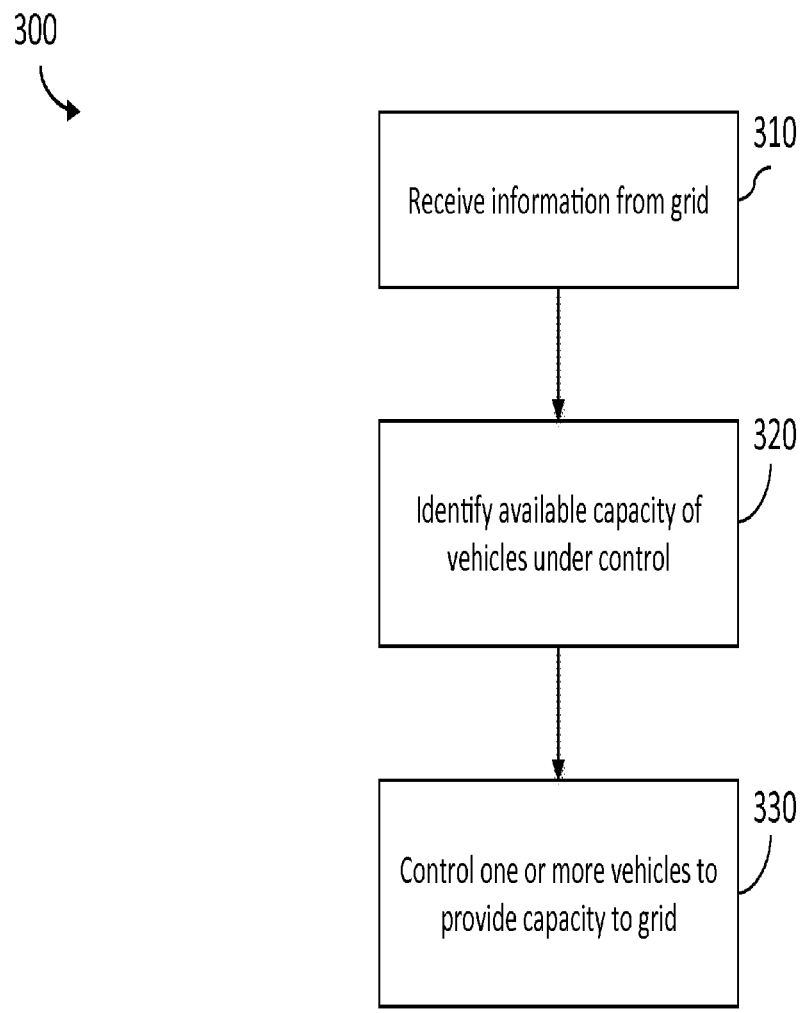
FIG. 3 is a flow diagram illustrating a routine for providing a dynamic load to an electric grid.

FIG. 3 is a flow diagram illustrating a routine 300 for providing a dynamic load to an electric grid. In operation 310, the system receives information from an electric grid. For example, the grid communication module 210 receives information indicating an electric grid requires storage capacity and/or indicating a grid condition where a current available electric power is higher than a current demand for the power.

In operation 320, the system identifies an available load capacity associated with one or more vehicles under control of the system. For example, the vehicle control module 220 identifies and/or determines an available capacity associated with electric vehicles (e.g., a fleet of vehicles) in communication with the system. In some cases, the vehicle control module 220 may communicate with computing systems 135*a*-*c* of electric vehicles 130*a*-*c* to identify a total available capacity of the batteries of the electric vehicles 130*a*-*c*.

In operation 330, the system controls the one or more vehicles to provide the requested capacity to the grid. For example, the vehicle control module 220 may start, stop, pause, schedule and/or delay charging operations associated with the one or more vehicles in order to provide the requested capacity for a certain period of time. Once the capacity is no longer required, the vehicle control module 220 may then resume or commence charging operations.

Figure 4:
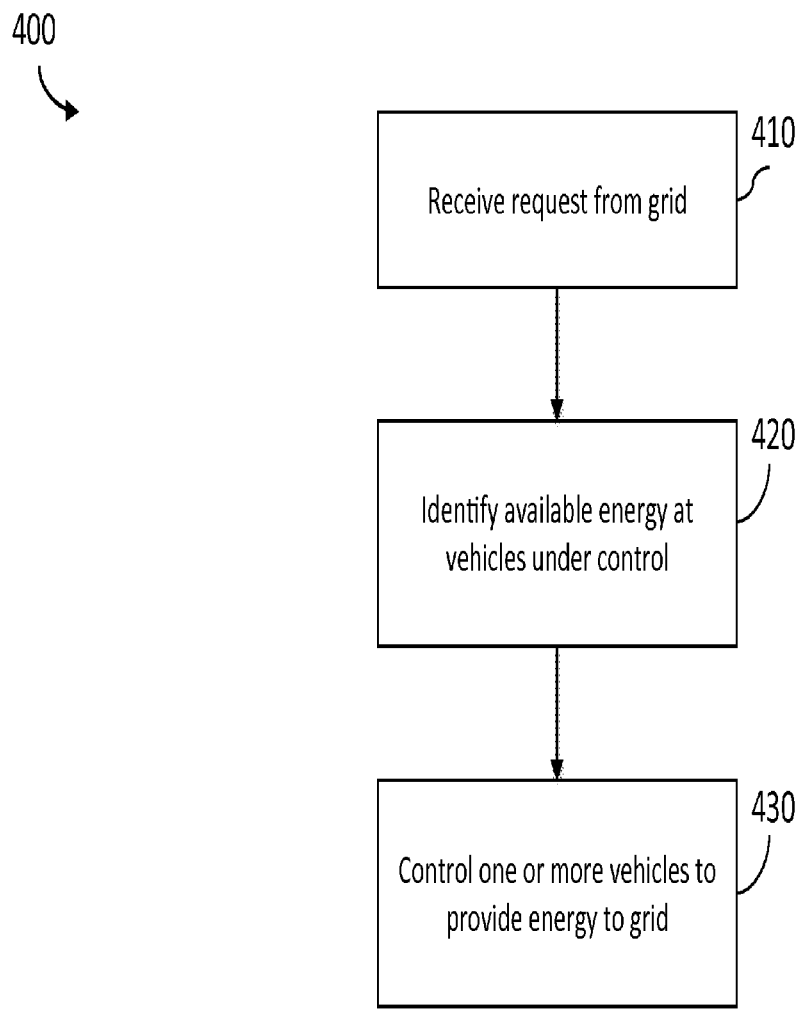
FIG. 4 is a flow diagram illustrating a routine for providing on demand energy to an electric grid.

In some examples, the g2v system 125 may also assist in balancing a grid when a current demand for electric energy exceeds a current available power capacity. FIG. 4 is a flow diagram illustrating a routine for providing on demand energy to an electric grid. In operation 410, the system receives a request to provide power to the electric grid. For example, the grid communication module 210 receives a request from the electric grid 110 during a peak condition within the grid to provide a certain amount of electric power to the grid to satisfy the peak condition.

In operation 420, the system identifies available electric power stored via one or more vehicles under control of the system. For example, the vehicle control module 220 identifies and/or determines the available power resources associated with electric vehicles in communication with the system. In some cases, the vehicle control module 220 may communicate with computing systems 135*a*-*c* of electric vehicles 130*a*-*c* to identify the total available power, or the system allotted available power, within batteries of the electric vehicles 130a-c. For example, the g2v system 125 may allot a certain amount of power to be provided to the grid.

In operation 430, the system controls the one or more vehicles to provide the requested power to the grid. For example, the vehicle control module 220 may cause the one or more vehicles to discharge power to the electric grid. In some cases, the system may pause the charging operations of electric vehicles in order to remove power consumption from the electric grid, which may also assist in load balancing.

Thus, in some examples, the g2v system 125 described herein may perform a variety of methods in order to condition an electric grid. For example, the g2v system may start an active charging of one or more vehicles when the current condition indicates electric production is greater than electric consumption, and/or may stop an active charging of the one or more vehicles when the current condition indicates electric consumption is greater than electric production.

In addition, the g2v system 125, in some examples, may perform the methods when conditioning the grid at certain grid components, such as transformers. For example, the g2v system 125 may detect an unbalanced load and/or voltage condition at a transformer of the grid, and control electric vehicles in communication with the grid at a location that includes the transformer, in order to balance the load and/or voltage at the transformer. As another example, the g2v system, 125 may detect and/or anticipate a potential or future unbalanced condition without receiving information from the grid, and control associated vehicles in order to anticipate and/or prevent the potential unbalanced condition at the transformer or other localized grid component.

Other conditions, such as conditions associated with a cost of electric power, may cause the g2v system 125 to control the charging operations (such as via the methods described herein), and other operations, of electric vehicles, including:

When the current, scheduled, and/or expected condition indicates a cost of electric power is below a certain threshold cost;

When the current, scheduled, and/or expected condition indicates a cost of electric power is above a certain threshold cost;

When the current, scheduled, and/or expected condition indicates a price of providing available load capacity is above a certain threshold price;

When the received information indicates the current, scheduled, and/or expected price for electric power is below a threshold price;

When the received information indicates the current, scheduled, and/or expected price for electric power is above a threshold price; and/or When the received information indicates the current, scheduled, and/or expected price to provide load capacity is above a threshold price.

In some examples, the g2v system 125 may provide cost benefits to users of electric vehicles under control of the system. For example, the g2v system 125 may facilitate providing discounted or free electric power to the users of electric vehicles that provide their vehicles to an electric grid for load balancing purposes.

For example, the g2v system 125 may determine the cost to charge a fleet of electric vehicles that is based on the price (e.g., a current price) for electric power provided by the electric grid, and when the difference between the determined cost to charge the fleet of electric vehicles and a normal cost to the charge the fleet of electric vehicles is greater than a price to provide the fleet of electric vehicles as load capacity to the electric grid, the g2v system 125 may cause the fleet of electric vehicles to be charged. As an example, the g2v system 125 may determine a current cost to charge a fleet of electric vehicles is $20 less than a normal cost, and because the current cost of $20 is greater than a price ($10) the g2v system 125 charges to the electric grid to maintain the electric vehicles as load capacity, the g2v system 125 causes the vehicles to charge, because the cost savings is greater than the load capacity income provided by the electric grid.

Additionally, the g2v system 125 may consider the needs of electric vehicle users when controlling charging operations and/or other operations based on electric grid demands. For example, the g2v system 125 may store information associated with when a vehicle is available as a load for an electric grid, and only use the vehicle during the identified available periods. The g2v system 125 may receive, as input, information from a user or driver of the vehicle that indicates user preferences, such as preferences identifying a window or time in which the g2v system 125 may utilize his/her vehicle, a state of charge at which the g2v system 125 may utilize his/her vehicle, a location at which the g2v system 125 may utilize his/her vehicle. In addition, the g2v system 125 may provide the user with various recommended preferences or options for utilizing the g2v system 125.

In some cases, the g2v system 125 may perform other operations at or associated with an electric vehicle in order to provide the vehicle (or multiple vehicles) as a dynamic load to an electric grid. For example, when the g2v system 125 receives a request to balance a grid that is unbalanced, the g2v system 125 may control certain operations at electric vehicles (e.g., air conditioners, heaters, and so on), in order to extract power from the grid. Of course, one of ordinary skill in the art will realize that other methods may be performed by the system.

Additionally alternatively, in some examples, the g2v system 125 may selectively sub-divide and/or allot certain portions of an available load to certain conditions associated with an electric grid. For examples, the g2v system 125 may allot a first portion (e.g., 50 percent) of a total available load capacity (either by vehicle, capacity, and so on) to a scheduled or expected load capacity, a second portion (e.g., 25 percent) to a high value or unexpected load capacity condition, and a remaining portion (e.g., 25 percent) to other conditions. In some cases, users may determine or select how their vehicles are allotted and/or the g2v system 125 may select or provided recommendations based on knowledge of use patterns associated with the vehicles and/or other characteristics associated with the vehicles.

Thus, in some examples, the g2v system 125 described herein assists in balancing a load on an electric grid by providing a flexible on-demand load capacity and/or electric power to an electric grid (depending on conditions of the grid) and/or by charging electric vehicles certain grid conditions and/or pricing are desirable and/or satisfy certain threshold conditions, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device, the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. Accordingly, the inventors reserve the right to add additional claims after filing the application to pursue such additional claim forms for other aspects of the system

What is claimed is:

1. A system, comprising:
   a grid communication component, wherein the grid communication component is configured to receive information from an electric grid associated with a load condition of the electric grid; and
   a vehicle control component that communicates with multiple computing systems of multiple electric vehicles connected to the electric grid,
   wherein the vehicle control component is configured to:
      determine an anticipated future unbalanced load condition of the electric grid based on the load condition of the electric grid;
      select a subset of electric vehicles of the multiple electric vehicles connected to the electric grid based on the determined anticipated future unbalanced load condition of the electric grid; and
      transmit control instructions to computing systems of at least two electric vehicles of the selected subset of electric vehicles based on the determined anticipated future unbalanced load condition of the electric grid, including:
         control instructions to a first electric vehicle configured to start an active charging of the first electric vehicle when the load condition of the electric grid indicates electric production is greater than electric consumption for the electric grid, and
         control instructions to a second electric vehicle configured to cause the second electric vehicle to discharge power to the electric grid when the load condition of the electric grid indicates the electric consumption is greater than the electric production for the electric grid.

2. The system of claim 1, wherein the load condition of the electric grid indicates the electric grid is in an unbalanced load condition.

3. The system of claim 1, wherein the load condition of the electric grid is a current load condition of the electric grid.

4. The system of claim 1, wherein the load condition of the electric grid is a scheduled load condition of the electric grid.

5. The system of claim 1, wherein the grid communication component is configured to provide, to the electric grid, storage capacity information identifying a total electric storage capacity for the multiple electric vehicles connected to the electric grid.

6. The system of claim 1, wherein the grid communication component is configured to receive information from a micro-grid system.

7. The system of claim 1, wherein the grid communication component is configured to receive information from a household on-grid system.

8. The system of claim 1, wherein the grid communication component is configured to receive information from a household off-grid system.

9. The system of claim 1, wherein the load condition is associated with a certain transformer of the electric grid; and wherein the vehicle control component transmits control instructions to multiple computing systems of multiple electric vehicles connected to the electric grid at a location of the electric grid that includes the certain transformer.

10. The system of claim 1, wherein the load condition is associated with a sub-section of the electric grid; and wherein the vehicle control component transmits control instructions to multiple computing systems of multiple electric vehicles connected to the electric grid within the sub-section of the electric grid.

11. A method of controlling charging of a fleet of electric vehicles, the method comprising:
    detecting a potential unbalanced condition of an-electric grid; and
    selectively controlling charging operations of the fleet of electric vehicles in response to the detected potential unbalanced condition of the electric grid, by:
        determining a subset of electric vehicles of the fleet of electric vehicles is to be allotted as an available load to the electric grid based on the detected potential unbalanced condition of the electric grid;
        transmitting control instructions to a first electric vehicle of the subset of electric vehicles to start an active charging of the first electric vehicle when the potential unbalanced condition of the electric grid indicates electric production is greater than electric consumption, and
        transmitting control instructions to a second electric vehicle of the subset of electric vehicles to cause the second electric vehicle to discharge power to the electric grid when the potential unbalanced condition of the electric grid indicates electric consumption is greater than electric production.

12. The method of claim 11, wherein selectively controlling charging operations of the fleet of electric vehicles includes maintaining an available load capacity for the electric grid in response to the information identifying the unbalanced condition of the electric grid.

13. The method of claim 11, wherein the unbalanced condition of the electric grid is an unbalanced load condition of the electric grid.

14. The method of claim 11, wherein the unbalanced condition of the electric grid is an unbalanced voltage condition of the electric grid.

15. The method of claim 11, wherein the first electric vehicle and the second electric vehicle are connected to the electric grid at a common location of the electric grid.

16. A method, comprising:
    receiving information from an electric grid that indicates a future load condition of the electric grid is a peak load condition of the electric grid; and
    in response to receiving the information from the electric grid that indicates the future load condition of the electric grid, selectively controlling charging operations of a fleet of electric vehicles connected to the electric grid by transmitting control instructions to two or more electric vehicles of the fleet of electric vehicles to cause the two or more electric vehicles to discharge power to the electric grid,
        wherein the two or more electric vehicles are allocated to the electric grid as an available load based on the information indicating the future load condition of the electric grid is a peak load condition of the electric grid.

17. The method of claim 16, wherein selectively controlling charging operations of the fleet of electric vehicles includes identifying a total available power stored by the two or more electric vehicles and available to be provided to the electric grid during the peak load condition.

* * * * *